United States Patent
Lamprecht

(10) Patent No.: US 12,120,977 B2
(45) Date of Patent: Oct. 22, 2024

(54) METHOD AND APPARATUS FOR CONTROLLING NOZZLE FLOW RATES

(71) Applicant: Topcon Positioning Systems, Inc., Livermore, CA (US)

(72) Inventor: Marko Lamprecht, Gera (DE)

(73) Assignee: Topcon Positioning Systems, Inc., Livermore, CA (US)

( * ) Notice: Subject to any disclaimer, the term of this patent is extended or adjusted under 35 U.S.C. 154(b) by 1016 days.

(21) Appl. No.: 17/071,981

(22) Filed: Oct. 15, 2020

(65) Prior Publication Data
US 2022/0117151 A1    Apr. 21, 2022

(51) Int. Cl.
| | |
|---|---|
| A01C 23/00 | (2006.01) |
| A01C 21/00 | (2006.01) |
| A01C 23/04 | (2006.01) |
| A01M 7/00 | (2006.01) |
| B05B 12/12 | (2006.01) |
| B05B 12/16 | (2018.01) |

(52) U.S. Cl.
CPC .......... *A01C 23/007* (2013.01); *A01C 21/005* (2013.01); *A01C 23/047* (2013.01); *A01M 7/0042* (2013.01); *A01M 7/005* (2013.01); *A01M 7/0089* (2013.01); *B05B 12/12* (2013.01); *B05B 12/126* (2013.01); *B05B 12/16* (2018.02)

(58) Field of Classification Search
CPC ... A01C 23/007; A01C 21/005; A01C 23/047; A01M 7/0042; A01M 7/005; A01M 7/0089; B05B 12/12; B05B 12/126; B05B 12/16; A01B 79/005
See application file for complete search history.

(56) References Cited

U.S. PATENT DOCUMENTS

| | | |
|---|---|---|
| 4,763,836 A | 8/1988 | Lyle et al. |
| 5,134,961 A | 8/1992 | Giles et al. |
| 5,246,164 A | 9/1993 | McCann et al. |

(Continued)

FOREIGN PATENT DOCUMENTS

| | | |
|---|---|---|
| CN | 104521929 A | 4/2015 |
| EP | 2022329 A2 | 2/2009 |
| WO | 2019148138 A1 | 8/2019 |

OTHER PUBLICATIONS

International Search Report and Written Opinion mailed Nov. 19, 2021, in connection with International Patent Application No. PCT/US2021/071165, filed Aug. 12, 2021, 12 pgs.

(Continued)

*Primary Examiner* — Anne Marie Antonucci
*Assistant Examiner* — Jewel Ashley Kuntz
(74) *Attorney, Agent, or Firm* — Chiesa Shahinian & Giantomasi PC

(57) ABSTRACT

A method for the application of agricultural fluid to a field includes determining a location of each of a plurality of nozzles of an agricultural spraying machine. A flow rate for each of the nozzles is determined based on each respective nozzle's location in the field. A field map is used to determine a crop requirement and application restriction associated with a nozzle's location. The field map contains indications of crop requirements and application restrictions. The flow rate for a nozzle is determined by comparing the nozzle's location to the field map. A flow rate signal is transmitted to each of the nozzles based on its determined flow rate.

20 Claims, 7 Drawing Sheets

(56) References Cited

U.S. PATENT DOCUMENTS

| | | | |
|---|---|---|---|
| 5,337,959 | A | 8/1994 | Boyd |
| 5,653,389 | A | 8/1997 | Henderson et al. |
| 5,704,546 | A | 1/1998 | Henderson et al. |
| 6,126,088 | A | 10/2000 | Wilger et al. |
| 6,230,091 | B1 | 5/2001 | McQuinn |
| 6,375,089 | B1 | 4/2002 | Taylor et al. |
| 6,678,580 | B2 | 1/2004 | Benneweis |
| 8,523,085 | B2 | 9/2013 | Grimm et al. |
| 9,435,458 | B2 | 9/2016 | Needham et al. |
| 9,532,514 | B2 | 1/2017 | Hamann et al. |
| 2008/0230624 | A1 | 9/2008 | Giles et al. |
| 2013/0292487 | A1 | 11/2013 | Ballu et al. |
| 2016/0227755 | A1* | 8/2016 | Preheim ............... B05B 12/08 |
| 2017/0036228 | A1 | 2/2017 | Thurow et al. |
| 2021/0068384 | A1* | 3/2021 | McMenamy ....... A01M 7/0089 |
| 2022/0340277 | A1* | 10/2022 | Faers ..................... B64D 1/18 |

OTHER PUBLICATIONS

Rashidi et al., "Variable Rate Herbicide Application Using GPS and Generating a Digital Management Map," Herbicides, Theory and applications, Chapter 7, 2011, pp. 128-144.

Li et al., "Design and experiment of variable rate orchard sprayer based on laser scanning sensor," Int J Agric & Biol Eng, 2018, vol. 11, No. 1, pp. 101-108.

Han et al., "Modification and testing of a commercial sprayer with PWM solenoids for precision spraying," 2001, Applied Engineering in Agriculture. vol. 17, No. 5, pp. 591-594.

Evans et al. "Adoption of site-specific variable rate sprinkler irrigation systems," Jul. 14, 2012, Irrigation Scienc, vol. 31, pp. 871-887.

* cited by examiner

METHOD AND APPARATUS FOR CONTROLLING NOZZLE FLOW RATES

FIELD OF THE INVENTION

The present invention relates generally to agricultural machines, and more particularly to application rates for agricultural sprayers.

BACKGROUND OF THE INVENTION

Agricultural fields require application of materials such as pesticide and fertilizer. Use of agricultural equipment, such as an agricultural sprayer, makes the process of applying materials faster and easier than older and more labor intensive methods. An agricultural sprayer is a machine for applying agricultural fluid to an area. An agricultural sprayer typically has a plurality of spray nozzles spaced along a horizontal support, known as a boom, that is moved over an area. A tank supplies the agricultural fluid to each spray nozzle to apply the agricultural fluid to the area under each nozzle. However, application of agricultural fluid using a sprayer is often inaccurate with some areas receiving more or less agricultural fluid than other areas. This is because a typical agricultural sprayer applies agricultural fluid at a constant rate from the entire width of an agricultural sprayer. Application of agricultural fluid to certain areas may occur more than once, or not at all, due to overlap in areas traversed by the boom.

The application of material is subject to constraints such as where fluid can be sprayed and how far from certain areas spraying can occur. For example, regulations, restrictions, and/or suggested practices may constrain the application of pesticide to areas near ground water or grazing fields. Such constraints require an operator of the agricultural sprayer to avoid spraying those areas by operating the agricultural sprayer outside of those areas. Maneuvering of the agricultural sprayer by the operator to avoid restricted areas can be difficult and often results in the incorrect application of material due to repeated passes or the application of no material in areas adjacent restricted areas. What is needed is a method and apparatus to simplify the application of fluid to areas using an agricultural sprayer.

BRIEF SUMMARY OF THE INVENTION

A method for the application of agricultural fluid to a field includes determining a location of each of a plurality of nozzles of an agricultural spraying machine in an agricultural field. A flow rate for each of the nozzles is determined based on each respective nozzle's location in the agricultural field using a field map associated with the agricultural field. The field map identifies crop requirements and application restrictions associated with areas of the agricultural field. The flow rate for each of the nozzles is based on the crop requirements and application restrictions associated with the location of a respective nozzle. A flow rate signal is transmitted to each of the nozzles based on its determined flow rate. In one embodiment, each of the plurality of nozzles is grouped into one of a plurality of nozzle groups and the location of each of the nozzles is based on a location of a respective one of the plurality of nozzle groups. In one embodiment, the flow rate of each nozzle group is calculated accounting for the velocity of the spraying machine, the crop requirement, and the application restriction.

These and other advantages of the invention will be apparent to those of ordinary skill in the art by reference to the following detailed description and the accompanying drawings.

DETAILED DESCRIPTION

Figure 1:
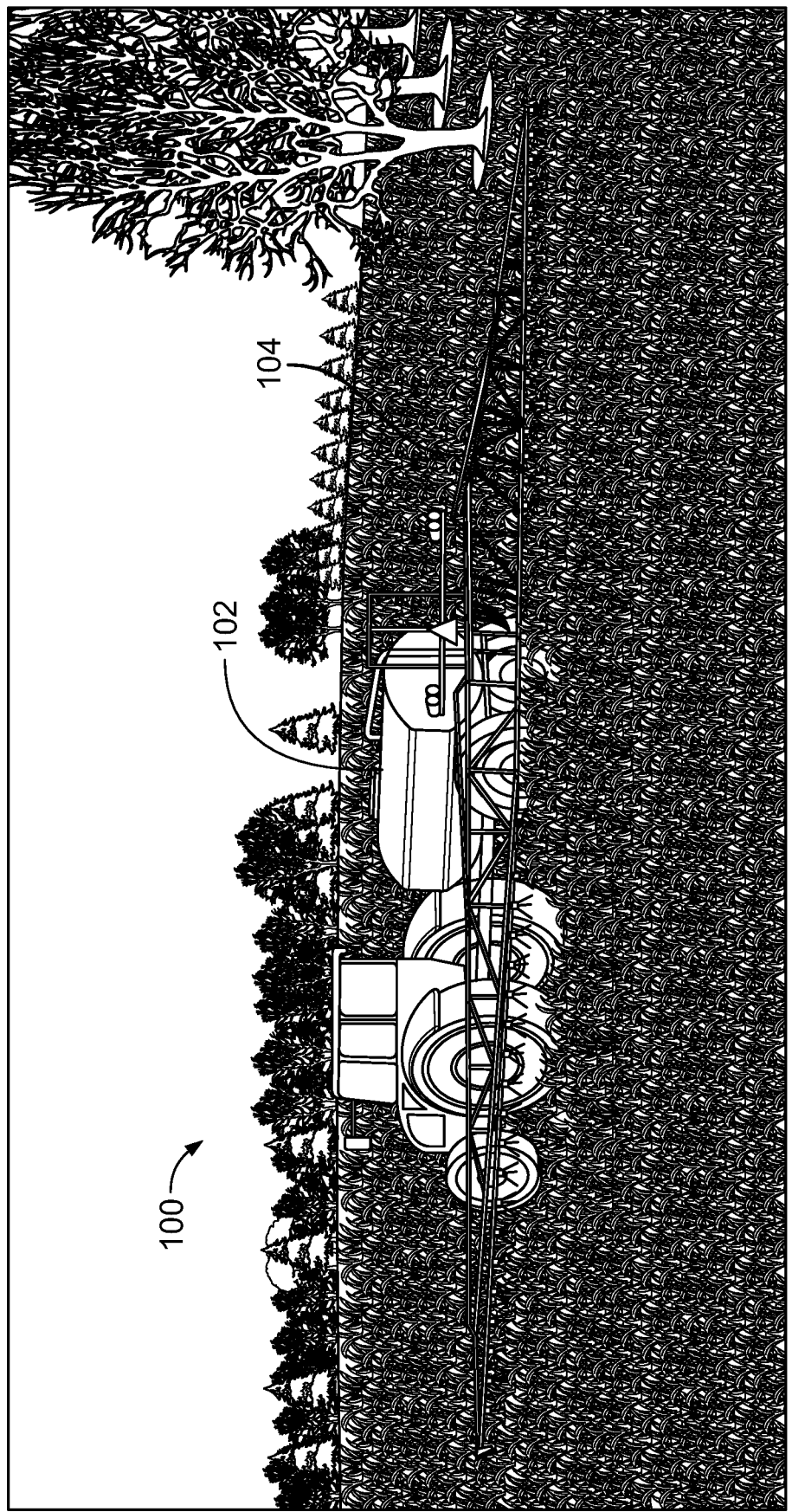
FIG. 1 depicts an agricultural sprayer applying agricultural material to crops as it moves over a field.

FIG. 1 depicts agricultural sprayer 100 applying agricultural fluid to crops as it moves over a field. Agricultural fluid stored in tank 102 is sprayed from boom 104. Agricultural fluid stored in tank 102 is a liquid that can be applied using a spray nozzle. The agricultural fluid can be pesticide, fertilizer, or any other type of liquid.

Figure 2:
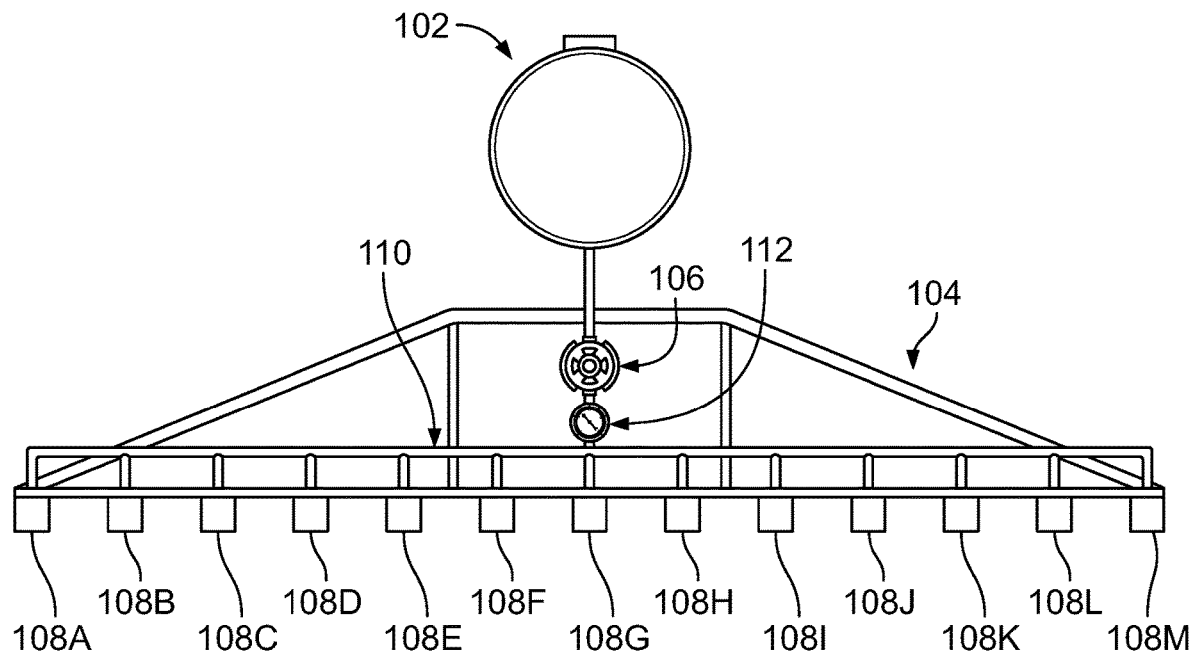
FIG. 2 depicts components of the agricultural sprayer.

FIG. 2 depicts tank 102 connected to fluid pump 106 supplying each of a plurality of nozzle groups 108A-108M with agricultural fluid via pressure regulator 112 and distribution rail 110. Agricultural fluid is drawn from tank by fluid pump 106 where the fluid is pressurized and forced through pressure regulator 112 and into distribution rail 110. Pressure regulator 112 maintains a desired fluid pressure in distribution rail 110. Each of nozzle groups 108A-108M comprises a plurality of spray nozzles that are electrically actuated to open thereby allowing agricultural fluid under pressure from distribution rail 110 to travel through an orifice of a nozzle which atomizes the agricultural fluid into a spray.

Figure 3:
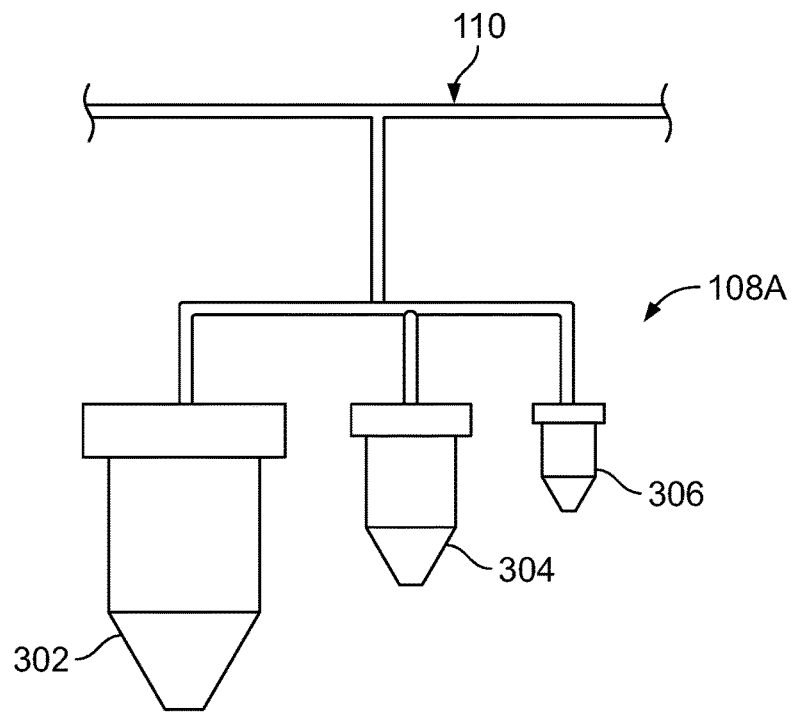
FIG. 3 depicts a nozzle group according to one embodiment.

FIG. 3 depicts details of nozzle group 108A. The details of nozzle groups 108B-108M are similar to nozzle group 108A. Each nozzle group comprises large nozzle 302, medium nozzle 304 and small nozzle 306, each of which comprise electro-mechanical valves having different flow rates. The flow rate of a nozzle is based on an orifice of the nozzle, the pressure of fluid applied to the nozzle, and the duty cycle of a pulse width modulated signal electrically applied to the nozzle. In one embodiment, each nozzle is electrically actuated to allow agricultural fluid under pressure from distribution rail 110 to travel through the orifice of the nozzle. In one embodiment, nozzles 302, 304, and 306 are each electrically driven using pulse width modulation. Pulse width modulation (PWM) is a periodic digital signal typically having a high value and a low value per cycle. In one embodiment, the high value of the PWM signal causes a nozzle of a nozzle group to open and the low value allows the nozzle to close due to spring pressure. The length of time that the high signal is applied for a particular cycle is referred to as the duty cycle of the PWM signal. The duty cycle can vary from 0 to 100 percent of the total possible time a high value can occur per cycle. A duty cycle of each nozzle can be varied in order to vary the amount of fluid output from a respective nozzle.

Each nozzle group can be used to apply a fluid at a variety of flow rates. Nozzles 302, 304, and 306 do not spray fluid in the absence of a signal. As such, a zero flow rate from the nozzles can be achieved by not transmitting signals to the nozzles. In order to output a maximum amount of agricultural fluid, all three nozzles of a group can be driven with a 100% duty cycle and a highest fluid pressure setting. In response, the nozzles output a maximum amount of agricultural fluid. In order to output a minimum amount of agricultural fluid, small nozzle 306 can be driven at a low duty cycle, such as 30%-40% with a minimum fluid pressure. In response, small nozzle 306 outputs a minimal amount of fluid. Any flow rate from minimum to maximum can be achieved by selecting an appropriate fluid pressure, nozzle combination, and duty cycle.

It should be noted that each nozzle group can comprise more than 3 nozzles or less than three nozzles. In addition, the minimum and maximum flow rates of the nozzles can vary depending on a desired application rate, selected nozzle types and acceptable droplet size.

Figure 4:
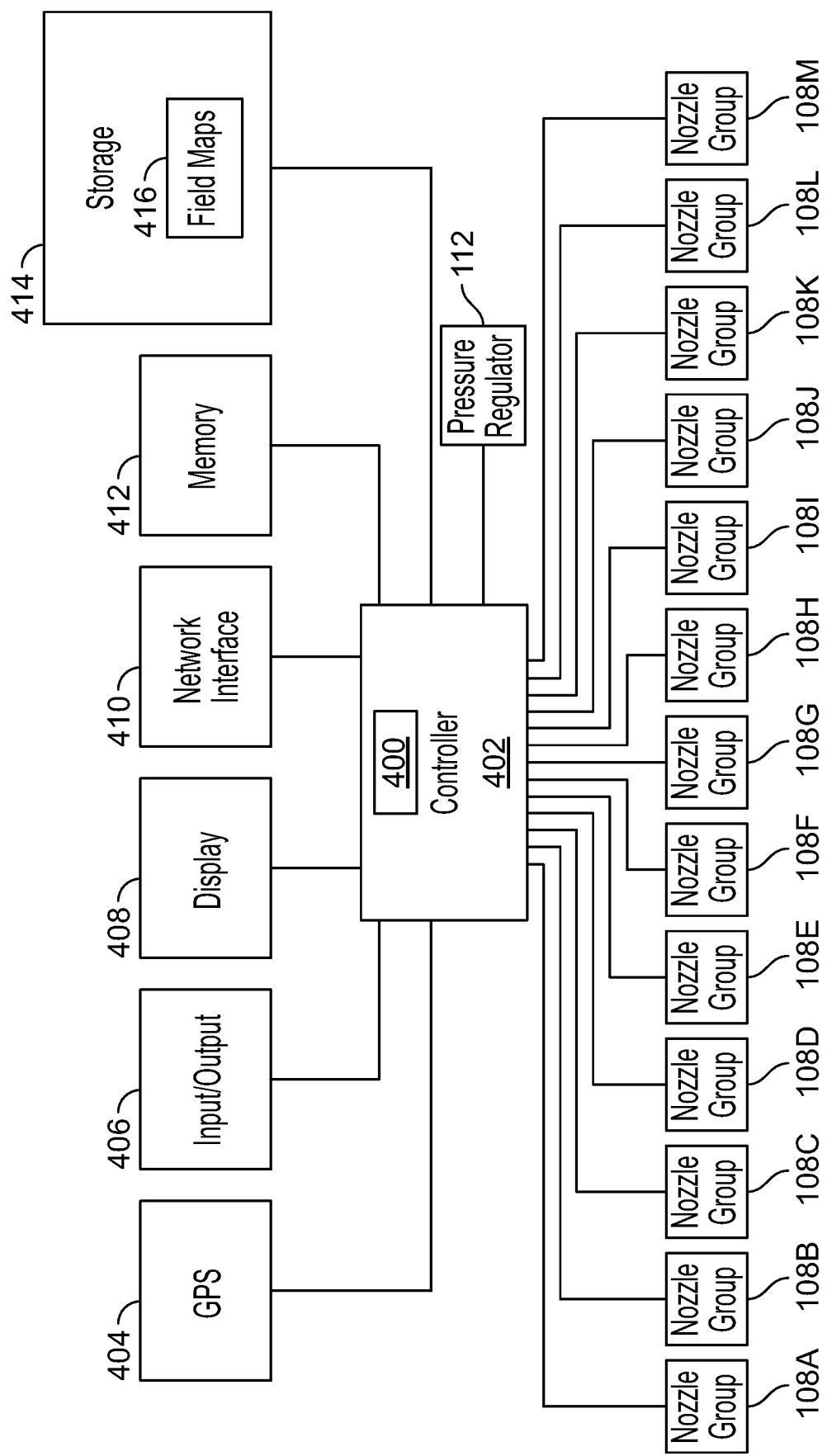
FIG. 4 depicts a schematic of a control system of the agricultural sprayer.

FIG. 4 depicts a schematic of a control system for agricultural sprayer 100. Controller 402 can be an electric control device such as a programmable logic controller, application specific integrated circuit (ASIC), field programmable gate array (FPGA), etc. In one embodiment, controller 402 is implemented using a computer. Controller 402 contains a processor 400 which controls the overall operation of the controller 402 by executing computer program instructions which define such operation. The computer program instructions may be stored in a storage device 414, or other computer readable medium (e.g., magnetic disk, CD ROM, etc.), and loaded into memory 412 when execution of the computer program instructions is desired. Thus, the method steps of FIG. 8 (described below) can be defined by the computer program instructions stored in the memory 412 and/or storage 414 and controlled by processor 400 of controller 402 executing the computer program instructions. For example, the computer program instructions can be implemented as computer executable code programmed by one skilled in the art to perform an algorithm defined by the method steps of FIG. 8. Accordingly, by executing the computer program instructions, processor 400 of controller 402 executes an algorithm defined by the method steps of FIG. 8. One skilled in the art will recognize that an implementation of a controller could contain other components as well, and that controller 402 is a high level representation of some of the components of such a controller for illustrative purposes.

In one embodiment, a Global Navigation Satellite System (GNSS) is used to determine a position of each of the nozzle groups. Global Positioning Satellite receiver 404 (GPS) is electrically connected to controller 402. GPS 404 determines the location of its associated antenna and transmits the location information to controller 402. Input/output 406 can comprise various inputs, such as a keyboards, touch screens, etc. Input/output 406 can comprise various outputs, such as lights, alarms, etc. The inputs and outputs of input/output 406 are electrically connected to controller 402. Display 408 is connected to controller 402 and receives data representing display information such as images and text. Network interface 410 is electrically connected to controller 402 and facilitates communication with controller 402 via various devices. Network interface 410 can be various connection types including wired and wireless. Network interface 410 can also utilize a variety of communication protocols. Memory 412 is electrically connected to controller 402 and can comprise one or more types of random access memory, both volatile and non-volatile. Storage 414 is electrically connected to controller 402 and can be any type of data storage device configured for longer term storage than provided by memory 412. Storage 414 can be a storage device, such as a hard drive. Storage 414 contains field maps 416 which are described in further detail below.

Controller 402 is electrically connected to pressure regulator 112, which, as shown in FIG. 2 receives fluid from fluid pump 106 and maintains a desired fluid pressure in distribution rail 110. Controller 402 can transmit a signal to pressure regulator 112 to maintain the desired fluid pressure in distribution rail 110.

Controller 402 is electrically connected to nozzle groups 108A-108M. In one embodiment, controller 402 transmits a pulse width modulated signal to each nozzle of nozzle groups 108A-108M. Controller 402 modulates the duty cycle of each signal in order to control each nozzle to operate to produce a desired flow rate from each respective nozzle.

Figure 5A:
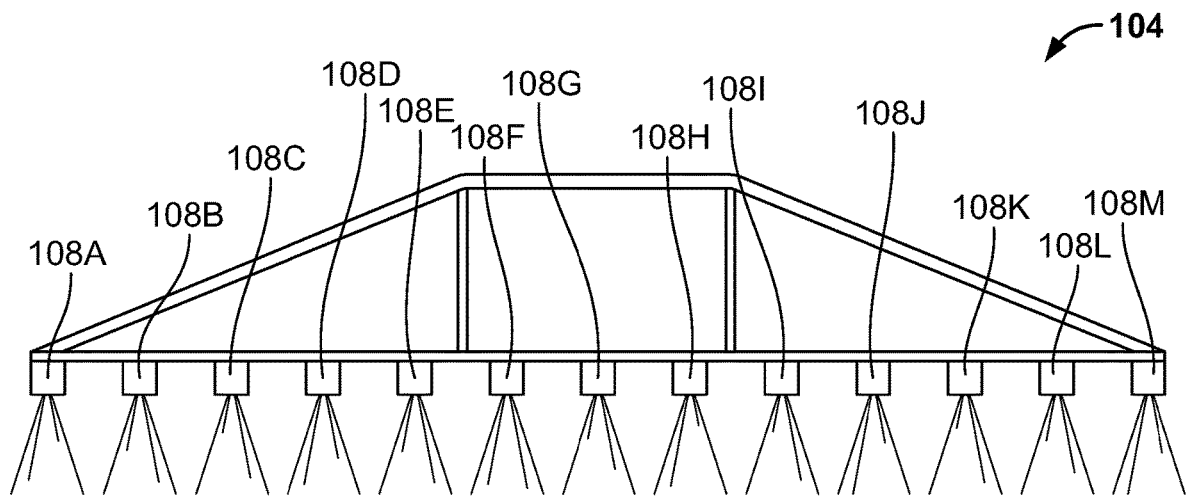
FIGS. 5A-5C depict operation of nozzle groups.

Controller 402 can transmit signals to each nozzle of nozzle groups 108A-108M in order to command each nozzle of nozzle groups 108A-108M to actuate. FIG. 5A depicts a scenario in which all of nozzle groups 108A-108M are actuated at a desired flow rate. As shown in FIG. 5A, fluid is being output from each of nozzle groups 108A-108M.

Figure 5B:
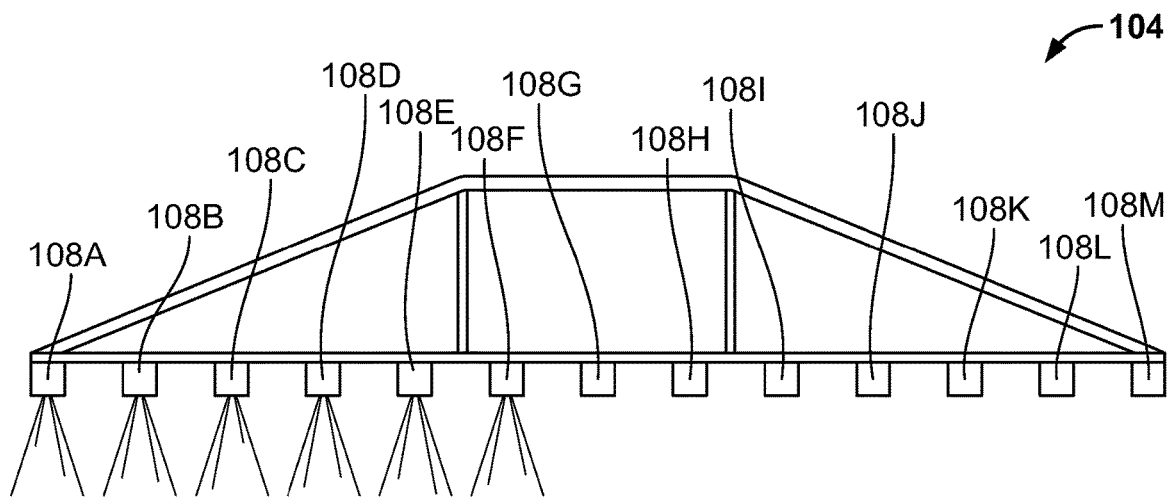

In some situations, not all nozzle groups 108A-108M are actuated. FIG. 5B depicts fluid being output from nozzle groups 108A-108F in response to signals from controller 402. Nozzle groups 108G-108M are commanded by controller 402 to not output fluid.

Figure 5C:
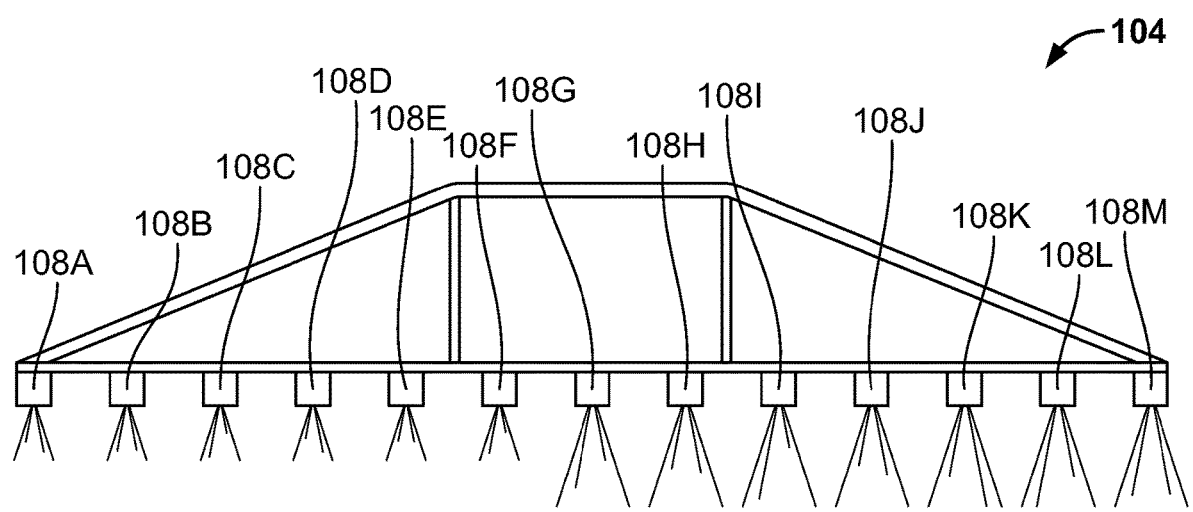

In some situations, nozzle groups may be controlled to output fluid at different flow rates by way of using different nozzles of a nozzle group, different fluid pressures, and/or different duty cycles, or various combinations of nozzles, fluid pressures and duty cycles. FIG. 5C depicts a situation in which nozzle groups 108A-108F are depicted outputting fluid at a specific flow rate. Nozzle groups 108G-108M are depicted outputting fluid at a flow rate higher than the flow rate from nozzle groups 108A-108F. In one embodiment, flow rates output by different nozzle groups are based on the location of the nozzle group along the boom of the agricultural sprayer. For example, the flow from a group of nozzles located on the inside of a turn that the agricultural sprayer is traversing will travel over less ground and require less output than a group of nozzles located on the outside of the turn which will travel over more ground and require more output. In one embodiment, flow rates from different nozzle groups can be different because the nozzle groups are travelling over portions of the field with different requirements.

In one embodiment, components including GPS receiver 404, network interface 410, display 408, memory 412, storage 414 (storing field maps 416) and a tractor electronic control unit are located on a tractor to which a sprayer assembly is connected. The sprayer assembly can include a main controller (such as controller 402) and a subcontroller that can be used to perform some of the functions of controller 402. ISOBUS (ISO 11783) is used in one embodiment where a CAN bus element is located on the tractor and extended to the sprayer as needed.

Agricultural fluids, such as fertilizer or pesticide, are required to be applied in specific amounts to an agricultural field. For example, a manufacturer of a liquid fertilizer specifies an amount of the liquid fertilizer that should be applied to an area such as one pint per square foot. These manufacturer's specifications are referred to as crop requirements. The flow rate of a nozzle group, such as nozzle group 108A, can be commanded by controller 402 in order to apply the liquid fertilizer to an area in accordance with the crop requirement. The application of liquid materials to an area may also be restricted by laws and/or rules regarding areas near surface water, other terrain features, and areas for specific uses, such as grazing fields for livestock. These restrictions are referred to as application restrictions. A field map can be used to identify crop requirements and application restrictions.

Figure 6:
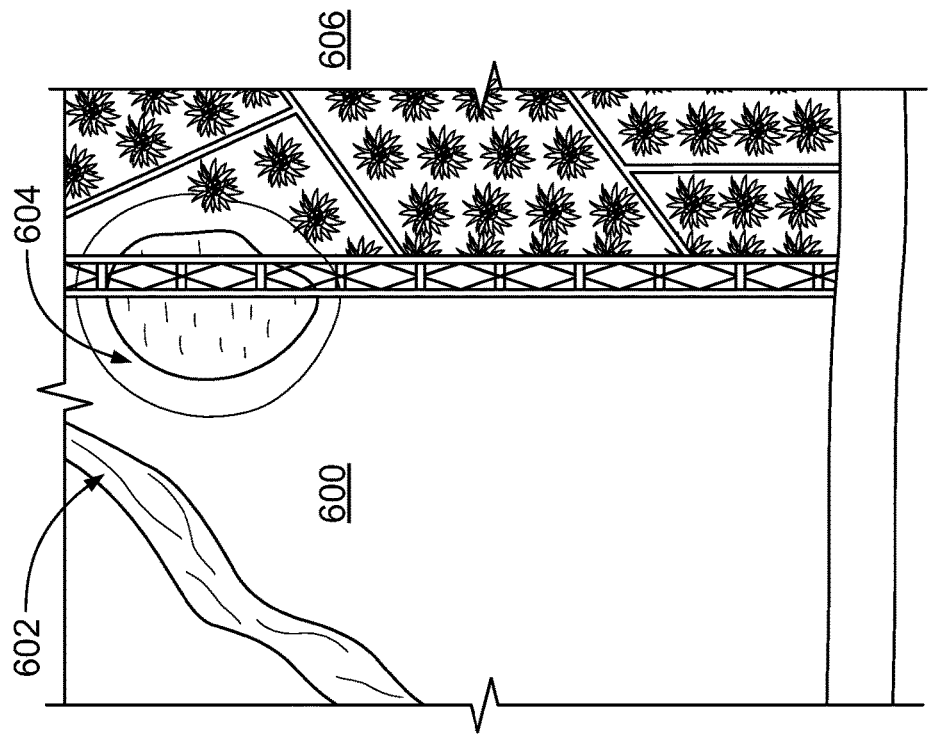
FIG. 6 depicts an agricultural field.

FIG. 6 depicts agricultural field 600. Stream 602 is depicted flowing through agricultural field 600. A portion of pond 604 is depicted located in agricultural field 600. Stream 602 and pond 604 can restrict usage of fertilizer and/or pesticide in agricultural field 600. Grazing field 606 is located adjacent to agricultural field. For example, fertilizer and/or pesticide may be restricted from being applied within a certain distance of stream 602, pond 604, and grazing field 606.

Figure 7:
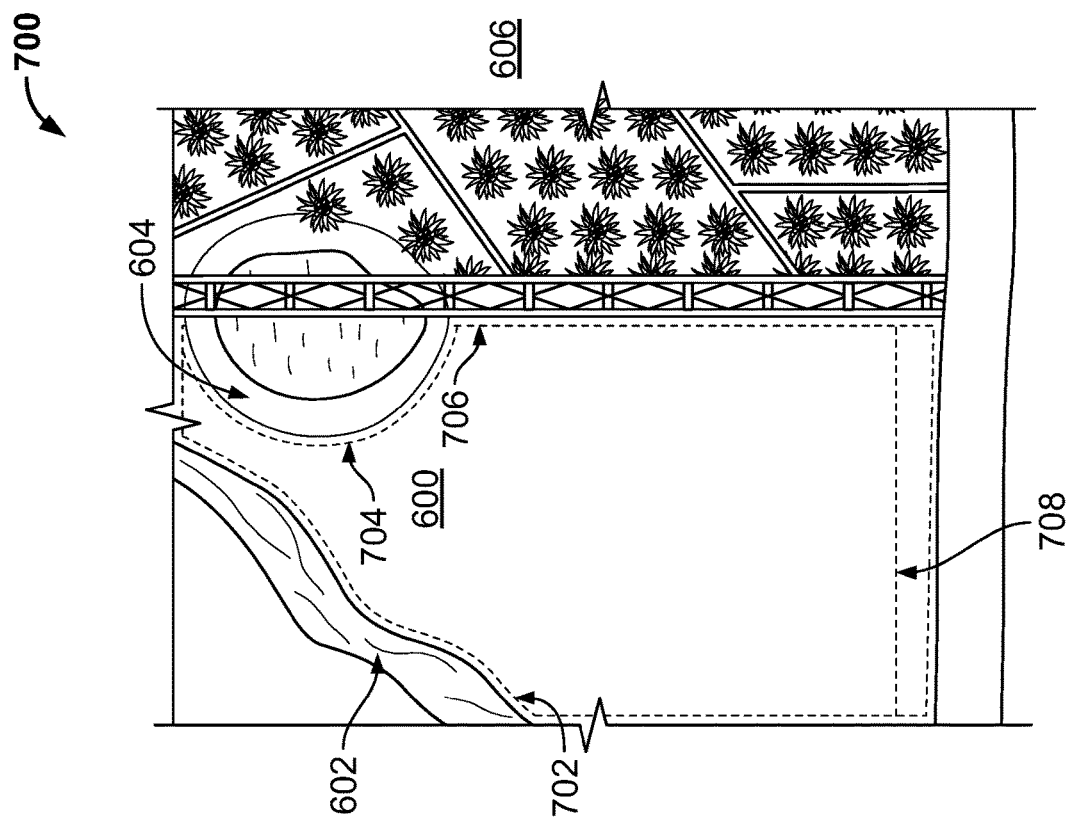
FIG. 7 depicts a field map.

FIG. 7 depicts field map 700 including agricultural field 600 with an overlay depicting crop requirements and restrictions of the application of agricultural fluids, such as fertilizer and/or pesticide. As described above, field maps can be stored in field maps 416 section of storage 414 (shown in FIG. 4). In one embodiment, field maps are generated remote from agricultural sprayer 100 using a device, such as a computer, and are saved to field maps 416 section of storage 414.

Stream offset 702 is a dashed line representing a restriction on the application of an agricultural fluid such as fertilizer and/or pesticide. The restriction, in this scenario, requires that a particular agricultural fluid not be applied with 20 feet of a running body of water. Stream offset 702 represents the restriction and approximates the shape of the edge of stream 602 at least 20 feet from the edge of the stream closest to agricultural field 600.

Pond offset 704 is a dashed line representing a restriction on the application of a particular agricultural fluid. The restriction, in this scenario, requires that the particular agricultural fluid not be applied within 20 feet of standing water. Pond offset 794 represents the restriction and approximates the edge of pond 604 located in and adjacent to agricultural field 604.

Grazing field offset 706 is a dashed line representing a restriction on the application of a particular agricultural fluid. The restriction, in this scenario, requires that the particular agricultural fluid not be applied within 30 feet of a grazing field 606. Grazing field offset 706 represents the restriction and approximates the shape of the edge of grazing field 606 adjacent to agricultural field 600. In one embodiment, drift of the applied fluid is controlled by controlling a droplet size to be applied for different applications. Droplet size affects the distribution of the liquid being sprayed. For example, smaller droplets can create a coating film while bigger droplets are not blown away by wind or evaporate before touching the crop to which the liquid is to be applied. As such, smaller droplets can be applied to main areas of a field while larger droplets can be applied to certain specific areas to prevent drift of the fluid being applied. In one embodiment, droplet size is changed by reducing the pressure of fluid applied to the nozzle in order to use the same nozzle to spray bigger droplets and keep the application rate at given speed by raising the duty cycle.

Crop requirement boundary 708 identifies a boundary between two sections of agricultural field 600 which are associated with different crop requirements. The crop requirement for the section of agricultural field 600 located above crop requirement boundary 708 is associated with a first crop requirement. The crop requirement for the section of agricultural field 600 located below crop requirement boundary 708 is associated with a second crop requirement. For example, the first crop requirement may indicate that more of an agricultural fluid is required to be applied to the section of agricultural field 600 located above crop requirement boundary 708 than an amount to be applied to the section of agricultural field 600 located below crop requirement boundary 708.

Figure 8:
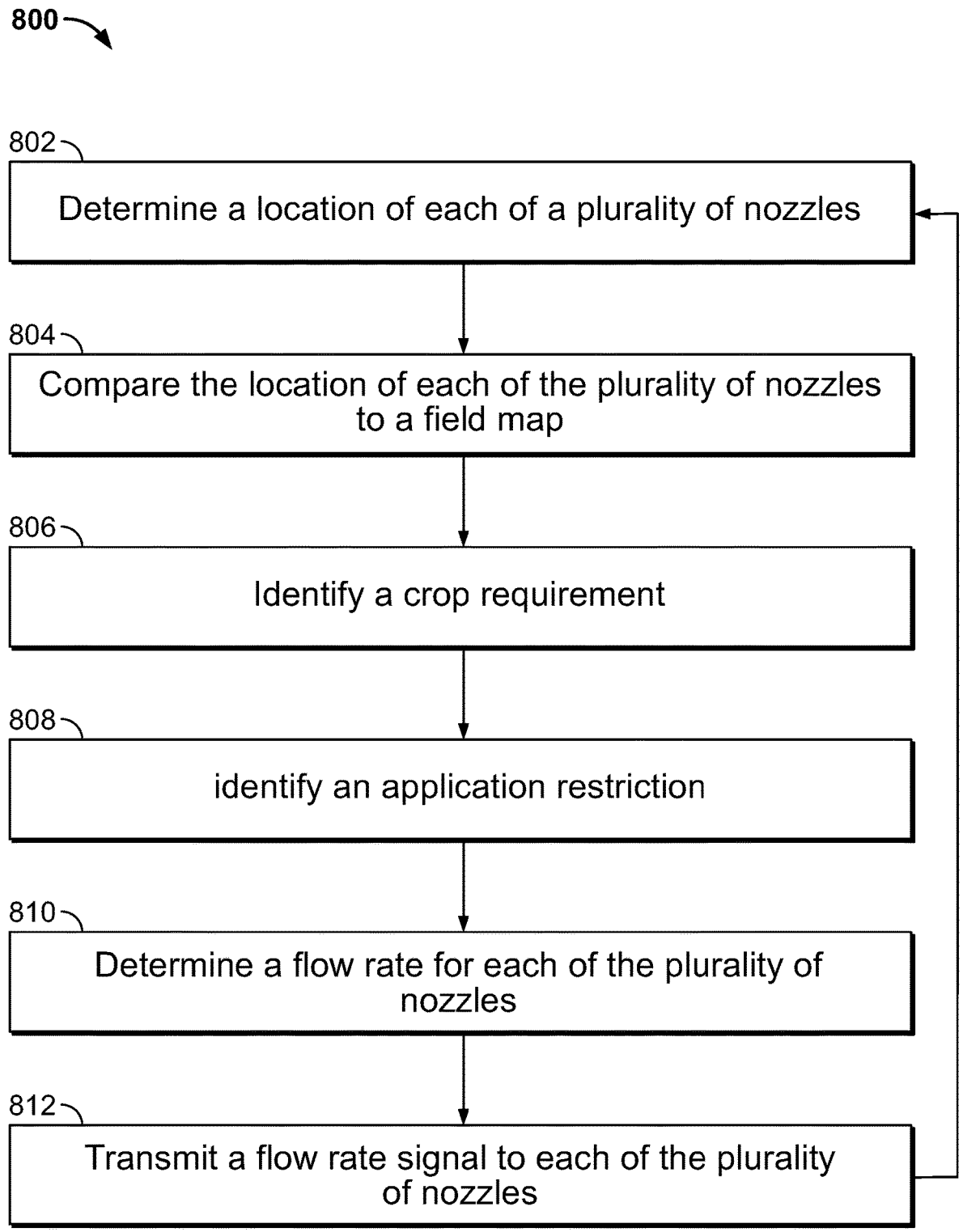
FIG. 8 depicts a flow chart of a method according to one embodiment.

FIG. 8 depicts a flow chart of a method for applying an agricultural fluid to a field. At step 802, a location of each nozzle group of a plurality of nozzle groups is determined. In one embodiment, the location of each nozzle group of the plurality of nozzle groups is based on location information received by controller 402 from GPS 404 (shown in FIG. 4). The location determined by GPS 404 is used along with a known distance from the location of the antenna associated with the GPS on agricultural sprayer 100 to the location of each nozzle group of nozzle groups 108A-108M (shown in FIGS. 1 and 2) in order to determine the location of each nozzle group of a plurality of nozzle groups 108A-108M with respect to agricultural field 600. It should be noted that when the agricultural sprayer is driven straight at a constant speed the actual flow rate from a nozzle depends on the requested rate for the current location being sprayed. Changing speed and turns can cause the actual flow rate to change significantly depending on the relative speed of each nozzle.

At step 804, the location of each nozzle group of the plurality of nozzle groups is compared to a field map. In one embodiment, the location of each nozzle group of the plurality of nozzle groups can be compared to field map 700 shown in FIG. 7. The comparison is used to determine factors that will affect a flow rate for each nozzle group of the plurality of nozzle groups. For example, a nozzle group located outside of areas bounded by stream offset 702, pond offset 704 and field offset 706 will not have its flow rate adjusted due to restrictions. A nozzle group located inside of areas bounded by stream offset 702, pond offset 704 or field offset 706 will have its flow rate adjusted to account for the area in which the nozzle group is located.

At step 806, a crop requirement is identified. In one embodiment a flow rate is associated with each location on field map 600 in which a crop is located. For example, a flow rate for a fertilizer or pesticide being applied by agricultural sprayer 100 to crops associated with field map 700 can be specified by a manufacturer of the fertilizer or pesticide based on the type of crops to which the fertilizer or pesticide will be applied.

At step 808, an application restriction is identified. An application restriction, in one embodiment, pertains to a specific amount of a fertilizer and/or pesticide that can be applied to a location based on the location's proximity to environmental features and/or use of an area near the location. For example, application of a fertilizer and/or a pesticide to an area can be restricted based on a body of standing or flowing water located near the area. An application restriction can limit a proximity of application to a particular area, a maximum application rate, nozzle type, nozzle size, and/or a droplet size designation. Application to an area can also be restricted based on use of adjacent areas. For example, application to an area can be restricted based on use of an adjacent area for livestock grazing. In one embodiment, an application restriction is identified if a nozzle group is determined to be located in an area bounded by stream offset 702, pond offset 704, or field offset 706. The application restriction is used to determine a flow rate for the nozzle group located in the area bounded by an offset. For example, a nozzle group determined to be located in an area bounded by an offset can be determined to have a minimum or zero flow rate.

At step 810, a flow rate for each nozzle group of the plurality of nozzle groups is determined. In one embodiment, the flow rate for each nozzle group is determined based on the crop requirement identified at step 806 and the application restriction identified at step 808. In one embodiment, the application restriction overrides the crop requirement. As such, if an application restriction indicates that a zero flow rate should be applied to an area and the crop requirement is a non-zero flow rate, the flow rate for the area will be zero.

At step 812, a flow rate signal is transmitted from controller 402 to each nozzle of each nozzle group of the plurality of nozzle groups. The flow rate signal for each nozzle of the plurality of nozzle groups is based on a respective flow rate determined for each nozzle group in step 810. The method then returns to step 802 and steps 802 through 812 are repeated.

It should be noted that flow rate is calculated in step 810 assuming that agricultural sprayer 100 is travelling at a known fixed velocity. In one embodiment, the velocity of agricultural sprayer 100 is determined using location data received over time from GPS 404 by controller 402. The flow rate determined in step 810 is calculated accounting for the velocity of agricultural sprayer 100. In one embodiment, vehicle speed can be adjusted (e.g., controlled) to be slower in response to the vehicle speed being too fast to allow the nozzles to create course droplets with all nozzles enabled. Similarly, other tractor and sprayer assembly functions can be controlled in order to produce desired droplet sizes and/or application rates.

It should be noted that the location of each nozzle of each nozzle group can be determined and flow rates can be determined based on the location of each nozzle. However, nozzles of a group are generally located in proximity to one another such that the location of each nozzle group is sufficient to determine a flow rate for application of agricultural fluid to a respective area.

In one embodiment, the spray of adjacent nozzle groups overlap. In this embodiment, the duty cycle of the adjacent nozzle groups can be interphased in order to improve coverage of the crop.

Crop requirements and restrictions can vary. Crop requirements can vary based on factors such as the concentration of an agricultural fluid. For example, an agricultural fluid diluted with water may require a higher flow rate. Restrictions can also vary. For example, some restrictions require that no agricultural fluid is applied to a specific area. A restriction can alternatively require a lower flow rate to a specific area as opposed to no application of agricultural fluid.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   determining a location of each of a plurality of nozzles of a spraying machine with respect to an agricultural field;
   determining a flow rate for each of the plurality of nozzles based on its location;
   adjusting the spraying machine velocity with respect to the agricultural field to be slower, in response to the spraying machine velocity with respect to the agricultural field being too fast, to allow the nozzles to create coarse droplets; and
   transmitting a flow rate signal to each of the plurality of nozzles based on its determined flow rate.

2. The method of claim 1, wherein each of the plurality of nozzles is grouped into one of a plurality of nozzle groups.

3. The method of claim 2, wherein the location of each of the plurality of nozzles is based on a location of a respective one of the plurality of nozzle groups.

4. The method of claim 1, wherein the determining a flow rate comprises comparing the location of each of the plurality of nozzles to a field map associated with the agricultural field.

5. The method of claim 4, wherein the field map comprises an indication of an application restriction associated with application of an agricultural fluid to the agricultural field.

6. The method of claim 5, wherein the field map comprises an indication of a crop requirement associated with application of the agricultural fluid to the agricultural field.

7. The method of claim 1, wherein the determining a flow rate for each of the plurality of nozzles is further based on one of a velocity of the spraying machine, a crop requirement, and an application restriction.

8. An apparatus comprising:
   a processor; and
   a memory to store computer program instructions, the computer program instructions when executed on the processor cause the processor to perform operations comprising:
   determining a location of each of a plurality of nozzles of a spraying machine with respect to an agricultural field;
   determining a flow rate for each of the plurality of nozzles based on its location;
   adjusting the spraying machine velocity with respect to the agricultural field to be slower, in response to the spraying machine velocity with respect to the agricultural field being too fast, to allow the nozzles to create coarse droplets; and
   transmitting a flow rate signal to each of the plurality of nozzles based on its determined flow rate.

9. The apparatus of claim 8, wherein each of the plurality of nozzles is grouped into one of a plurality of nozzle groups.

10. The apparatus of claim 9, wherein the location of each of the plurality of nozzles is based on a location of a respective one of the plurality of nozzle groups.

11. The apparatus of claim 8, wherein the determining a flow rate comprises comparing the location of each of the plurality of nozzles to a field map associated with the agricultural field.

12. The apparatus of claim 11, wherein the field map comprises an indication of an application restriction associated with application of an agricultural fluid to the agricultural field.

13. The apparatus of claim 12, wherein the field map comprises an indication of a crop requirement associated with application of the agricultural fluid to the agricultural field.

14. The apparatus of claim 8, wherein the determining a flow rate for each of the plurality of nozzles is further based on one of a velocity of the spraying machine, a crop requirement, and an application restriction.

15. An agricultural sprayer comprising:

a plurality of nozzles; and a controller in communication with the plurality of nozzles and configured to perform operations comprising:

determining a location of each of the plurality of nozzles with respect to an agricultural field;

determining a flow rate for each of the plurality of nozzles based on its location;

adjusting the agricultural sprayer velocity with respect to the agricultural field to be slower, in response to the spraying machine velocity with respect to the agricultural field being too fast, to allow the nozzles to create coarse droplets; and transmitting a flow rate signal to each of the plurality of nozzles based on its determined flow rate.

16. The agricultural sprayer of claim 15, wherein each of the plurality of nozzles is grouped into one of a plurality of nozzle groups.

17. The agricultural sprayer of claim 16, wherein the location of each of the plurality of nozzles is based on a location of a respective one of the plurality of nozzle groups.

18. The agricultural sprayer of claim 15, wherein the determining a flow rate comprises comparing the location of each of the plurality of nozzles to a field map associated with the agricultural field.

19. The agricultural sprayer of claim 18, wherein the field map comprises an indication of an application restriction associated with application of an agricultural fluid to the agricultural field.

20. The agricultural sprayer of claim 19, wherein the field map comprises an indication of a crop requirement associated with application of the agricultural fluid to the agricultural field.

* * * * *